(12) United States Patent
Parekh

(10) Patent No.: US 8,018,905 B2
(45) Date of Patent: Sep. 13, 2011

(54) METHOD AND APPARATUS FOR ACCESSING NETWORK AUTHENTICATION

(75) Inventor: Nilesh Parekh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 844 days.

(21) Appl. No.: 10/421,218

(22) Filed: Apr. 22, 2003

(65) Prior Publication Data
US 2003/0219003 A1 Nov. 27, 2003

Related U.S. Application Data

(60) Provisional application No. 60/374,944, filed on Apr. 22, 2002.

(51) Int. Cl.
H04B 7/216 (2006.01)
(52) U.S. Cl. ........ 370/335; 370/342; 370/352; 455/411; 455/435.1; 726/9
(58) Field of Classification Search .................. 370/352; 455/432.2, 410
See application file for complete search history.

(56) References Cited

U.S. PATENT DOCUMENTS

| 4,901,307 | A | 2/1990 | Gilhousen et al. |
|---|---|---|---|
| 5,668,875 | A | 9/1997 | Brown et al. |
| 5,978,478 | A | 11/1999 | Korematsu ........................ 380/9 |
| 6,229,808 | B1 | 5/2001 | Teich et al. |
| 6,278,697 | B1 | 8/2001 | Brody et al. |
| 6,314,284 | B1 | 11/2001 | Patel et al. |
| 6,320,873 | B1 | 11/2001 | Nevo et al. |
| 6,442,401 | B1 | 8/2002 | Behan |
| 6,487,406 | B1 | 11/2002 | Chang et al. |
| 6,526,033 | B1 | 2/2003 | Wang et al. |
| 6,526,034 | B1 | 2/2003 | Gorsuch |
| 6,545,992 | B2 | 4/2003 | Naqvi et al. |
| 6,584,310 | B1 | 6/2003 | Berenzweig |
| 6,608,832 | B2 | 8/2003 | Forslow |
| 6,681,111 | B2 * | 1/2004 | Ahn et al. .................. 455/432.2 |

(Continued)

FOREIGN PATENT DOCUMENTS

EP  1107467 A2  6/2001

(Continued)

OTHER PUBLICATIONS

Inter-Operability Specification (1Os) for High Rate Packet Data (HRPD) Access Network Interfaces Revision 0 (Post SDO Ballot, Pre-SDO Publication Version), Nov. 2001, URL: http:ll www.3gpp2. org/Public-htmllspecsIA. S0007-0.2.0-IOSfor-HRPD-in-An-Interfaces-Ballot-Res-clean.pdf.

(Continued)

Primary Examiner — Kwang B Yao
Assistant Examiner — Jeffrey M Rutkowski
(74) Attorney, Agent, or Firm — Sandip M. Minhas; Stanton C. Braden

(57) ABSTRACT

In a wireless communication system, a method of authenticating a mobile station is claimed. A first CHAP challenge message is transmitted. A first CHAP response message is received in response to the first CHAP message. An IMSI message corresponding to the received CHAP message is transmitted. A plurality of parameters is received in response to the transmitted IMSI message. at least one parameter is then transmitted. A second CHAP response message is received in response to the transmitted parameter. The second CHAP response message is then compared to one of said plurality of parameters.

20 Claims, 2 Drawing Sheets

U.S. PATENT DOCUMENTS

| | | | |
|---|---|---|---|
| 6,708,031 B2 | 3/2004 | Purnadi et al. | |
| 6,721,565 B1 | 4/2004 | Ejzak et al. | |
| 6,741,868 B1 | 5/2004 | Park et al. | |
| 6,928,558 B1* | 8/2005 | Allahwerdi et al. | 726/9 |
| 6,987,751 B2 | 1/2006 | Jain et al. | |
| 7,075,904 B1 | 7/2006 | Manish et al. | |
| 7,155,526 B2* | 12/2006 | Chaudhary et al. | 455/411 |
| 7,230,936 B2 | 6/2007 | Parekh et al. | |
| 2002/0061745 A1 | 5/2002 | Ahn et al. | 455/432 |
| 2002/0168960 A1 | 11/2002 | Jacobson et al. | 455/410 |
| 2002/0173320 A1 | 11/2002 | Aitken et al. | 455/466 |
| 2003/0114155 A1 | 6/2003 | Jain et al. | |
| 2003/0133425 A1 | 7/2003 | Radhakrishnan et al. | |
| 2006/0050680 A1* | 3/2006 | Naim et al. | 370/352 |
| 2007/0060106 A1* | 3/2007 | Haverinen et al. | 455/410 |
| 2008/0242264 A1* | 10/2008 | Malik et al. | 455/411 |

FOREIGN PATENT DOCUMENTS

| | | |
|---|---|---|
| GB | 2333012 A | 7/1999 |
| JP | 7307982 A | 11/1995 |
| JP | 19979503895 | 4/1997 |
| JP | 2001-230816 A | 8/2001 |
| JP | 2001255819 | 9/2001 |
| TW | 357515 | 5/1999 |
| TW | 371824 | 10/1999 |
| TW | 466838 B | 12/2001 |
| WO | WO 99/16266 A1 | 4/1999 |
| WO | WO0013440 | 3/2000 |
| WO | WO0013441 A2 | 3/2000 |
| WO | WO0110146 | 2/2001 |
| WO | WO0131840 A1 | 5/2001 |
| WO | WO0141470 A2 | 6/2001 |

OTHER PUBLICATIONS

International Search Report—PCT/US2003/012193, International Search Authority—ISA/US—Alexandria, Virginia—Aug. 20, 2003.

International Preliminary Examination Report—PCT/US2003/012193, International Search Authority—IPEA/US - Alexandria, Virginia—Mar. 24, 2004.

Supplemental European Search Report—EP03724129, European Search Authority—Munich—Apr. 30, 2009.

\* cited by examiner

METHOD AND APPARATUS FOR ACCESSING NETWORK AUTHENTICATION

CROSS-REFERENCE TO RELATED APPLICATION

This application claims the benefit of priority of U.S. Provisional Patent Application No. 60/374,944, filed Apr. 22, 2002, titled "Method and Apparatus for Access Network Authentication," which is hereby incorporated by reference.

BACKGROUND OF THE INVENTION

I. Field of the Invention

The present invention generally relates to wireless communications. More specifically, the invention relates to a method of and apparatus for affecting authentication in a multi-cellular communications environment.

II. Description of the Related Art

The so-called code division multiple access (CDMA) modulation technique is but one of several techniques for facilitating communications in which a large number of system users are present. Although other techniques, such as time division multiple access (TDMA), frequency division multiple access (FDMA) and AM modulation schemes such as amplitude companded single sideband (ACSSB) are also available, CDMA has significant advantages over these other modulation techniques. The use of CDMA techniques in a multiple access communication system is disclosed in U.S. Pat. No. 4,901,307, entitled "Spread Spectrum Multiple Access Communication System Using Satellite Or Terrestrial Repeaters", assigned to the present assignee, the disclosure of which is incorporated herein by reference.

In U.S. Pat. No. 4,901,307 a multiple access technique is described in which a large number of mobile telephone system users, each having a transceiver, communicate through satellite repeaters or terrestrial base stations (also known as cell base stations, or cell-sites) using code division multiple access (CDMA) spread spectrum communication signals. In using CDMA communications, the frequency spectrum can be reused multiple times thus permitting an increase in system user capacity. The use of CDMA techniques results in a much higher spectral efficiency than can be achieved using other multiple access techniques.

In conventional cellular telephone systems the available frequency band is divided into channels typically 30 KHz in bandwidth while analog FM modulation techniques are used. The system service area is divided geographically into cells of varying size. The available frequency channels are divided into sets with each set usually containing an equal number of channels. The frequency sets are assigned to cells in such a way as to minimize the possibility of co-channel interference. For example, consider a system in which there are seven frequency sets and the cells are equal size hexagons. A frequency set used in one cell will not be used in the six nearest or surrounding neighbors of that cell. Furthermore, the frequency set in one cell will not be used in the twelve next nearest neighbors of that cell.

A more difficult situation is presented by movement of the mobile station into a cell serviced by a base station from another cellular system. One complicating factor in such "intersystem" handoffs is that the neighboring cellular system often has dissimilar characteristics. For example, adjacent cellular systems will often operate at different frequencies, and may maintain different levels of base station output power or pilot strength. Further, adjacent cellular systems may require different messaging structures, even for similar types of messages.

For example, the GSM standard does not provide for a direct methodology to effect access authentication into a CDMA network. Therefore, a call operating on a GSM network cannot directly migrate to a CDMA network. Furthermore, GSM authentication cannot be accomplished because the CDMA 2000 mechanisms are not designed to transfer the data required for GSM authentication. Encryption, message types, and message sizes are different in a GSM based network than a CDMA based network.

One way of authenticating between two communication networks would be to modify GSM to enable it to effect features of a non-GSM system, e.g. a CDMA system. However, both CDMA and GSM have been established for a long time now, relatively speaking, and operators and equipment providers are reluctant to make expensive modifications to existing equipment in order to accommodate a neighbouring incompatible system. If new messages are added to the air interface in support of dual-mode mobile stations, then modifications must be made to support these new messages. Plainly, this is undesirable form the perspective of the operator and of the equipment provider.

Therefore, what is needed is a method and mechanism to allow for authentication of a mobile station between different communication systems.

SUMMARY OF THE INVENTION

The invention addresses the above-discussed problems.

An interworking node is created which acts like a RAN-AAA to a CDMA network (or preferably, a CDMA2000 1xEVDO system) and acts like a MSC to a GSM/GPRS core network. For access authentication, the interworking node uses existing CHAP/AAA messages towards the CDMA network, and GSM-MAP messages towards the GSM core network/home location register (HLR). As such, this apparatus and method provides superior capacity and data packet rates then standard GSM/GPRS systems while preserving the benefits of the GPRS core network and not requiring any changes in CDMA systems.

According to one aspect of the invention there is provided a method of authenticating information from a first communications system to a corresponding message in a second, different communication system, each communication system having a corresponding core network, the method comprising: receiving authentication information in a format required by the first communication system; converting the authentication information from the format required in the first communication systems into a format required by the second communication system; and transmitting the authentication information in a format required by the second communication system to the core network of the second communication system.

The above and further features of the invention are set forth with particularity in the appended claims and together with advantages thereof will become clearer from consideration of the following detailed description of an exemplary embodiment of the invention given with reference to the accompanying drawings.

DETAILED DESCRIPTION OF AN EMBODIMENT OF THE INVENTION

Figure 1:
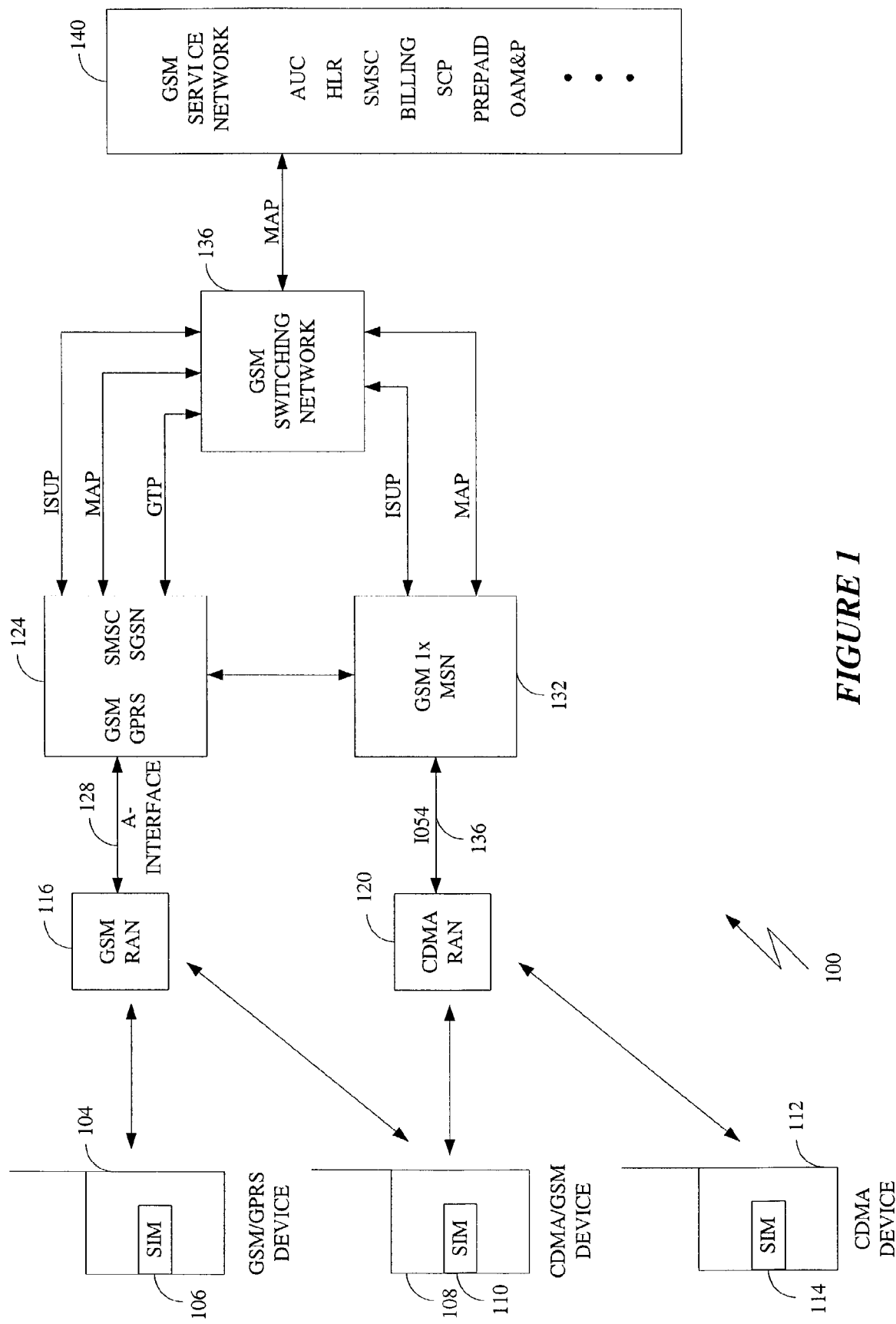
FIG. 1 is a schematic representation of a hybrid communication system.

FIG. 1 is a schematic illustration of an exemplary cellular telephone system 100. The illustrated system may utilize any of various multiple access modulation techniques for facilitating communications between a typically large number of system mobile stations or mobile telephones, and the base stations. Such multiple access communication system techniques include: time division multiple access (TDMA), global system for mobile communications (GSM), General Packet Radio Service (GPRS), High Speed Circuit Switched Data (iDEN), frequency division multiple access (FDMA), code division multiple access (CDMA), TS code division multiple access (TSCDMA) orthogonal frequency division multiplexing (OFDM) and AM modulation schemes such as amplitude companded single sideband.

For purposes of illustration, FIG. 1 describes the communications system as a combination of a CDMA based system and a GSM based system. It should be understood that any two communications systems may be employed, such as the communications systems discussed above.

Mobile station 104 exemplifies a GSM/GPRS device, having a subscriber identity module 106. Mobile station 108 exemplifies a GSM/CDMA2001 1x EVDO device, having a subscriber identity module 110. Mobile station 108 may be equipped with hardware and/or software modifications from traditional GSM or CDMA mobile stations, rendering the device to interface with both GSM and CDMA infrastructure. Mobile station 112 exemplifies a CDMA20001x device, having a subscriber identity module 114.

Mobile stations 104, 108 and 112 are wireless communication devices, such as mobile telephone, a personal digital assistant, computer or other wireless device capable of wireless communication of voice or data information. The SIM cards 106, 110, and 114 may be a standard GSM SIM card that is operable in a CDMA 20001x EVDO user terminal, capable of receiving and reacting to signals from base stations within both CDMA and GSM cellular systems. Such a GSM SIM card 108 integrated with a CDMA1x handset is discussed in U.S. Provisional Patent Application No. 60/350, 829, filed Jan. 17, 2002, and U.S. Provisional Patent Application No. 60/354,086, filed Feb. 1, 2002, both converted to U.S. patent application Ser. No. 10/076,831, filed Feb. 14, 2002, assigned to the same assignee as the present application, and is specifically enclosed by reference herein. The SIM cards 106, 110, and 114 may also be a specialized SIM card configured to operate in more than one wireless communication system.

Mobile station 104 is communicably coupled with radio access network (RAN) 116. In an embodiment, RAN 116 is a standard GSM or GSM/GPRS RAN, comprising standard GSM based base transceiver sub-system(s) (BTS) and a standard GSM base station controller (BSC) (not shown).

Mobile stations 108 and 112 are communicably coupled with radio access network (RAN) 120. Mobile station 108 may be communicably coupled with both RAN 116 and RAN 120. In an embodiment, RAN 120 is a CDMA1x RAN as described in U.S. Provisional Patent Application No. 60/340, 356, filed Dec. 14, 2002, converted to U.S. patent application Ser. No. 10/077,556, filed Feb. 14, 2002, assigned to the same assignee as the present application, and is specifically enclosed by reference herein. RAN 120 is a standard CDMA2000 or CDMA 20001x RAN, comprising standard CDMA-based base transceiver sub-system(s) (BTS) and a standard CDMA-based base station controller (BSC) (not shown).

GSM RAN 116 is coupled to a GSM SMSC/SGSN 124, over an A-interface 128. The GSM SMSC/SGSN 124 is coupled to a GSM switching network 132, using MAP, ISUP, and GTP interfaces and protocols.

CDMA RAN 120 is coupled to a GSM1x mobile switching node (MSN) 132, over a standard IOS4 interface/protocol 136. MSN 132 is preferably a hybrid MSN that is coupled to both RAN 120 and GSM switching network 136. GSM switching network 136 is coupled to the remainder of a GSM service network 140. MSN 132 is capable of communicating to both RAN 120 and GSM service network 140 by mapping messages expected in formats and structures in one cellular communication systems to formats and structures in a second cellular communication system. For example, if one communication system is a GSM system, and the second communication system is a CDMA2000-1x system, hybrid MSM 132 maps messages from formats and structures known in the GSM system to that known in a CDMA1x system, and vice-versa.

Figure 2:
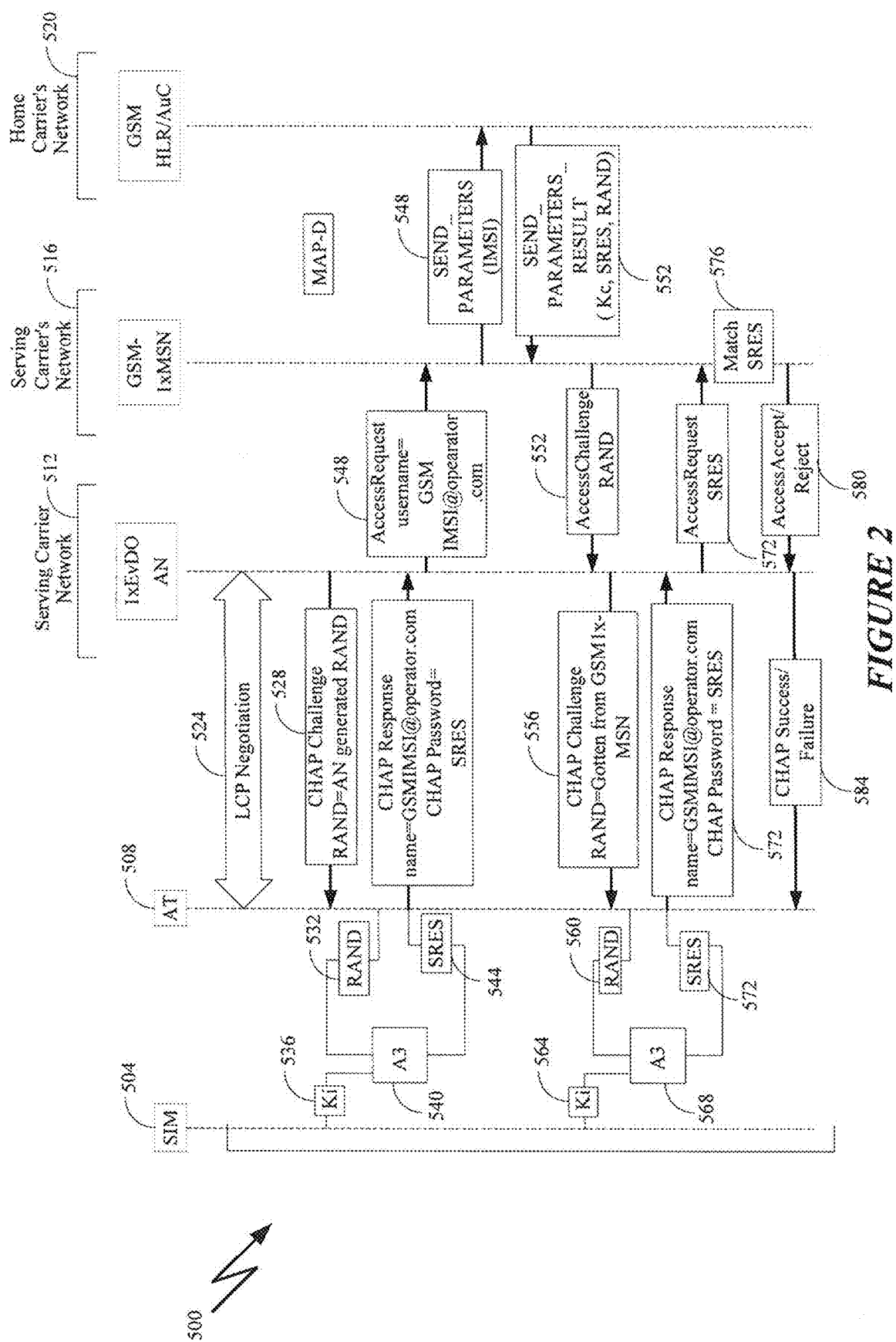
FIG. 2 is a schematic diagram of authentication to GSM MAP.

FIG. 2 illustrates an authentication apparatus 500 to allow for authentication between a CDMA based user terminal and a GSM system. Specifically, FIG. 2 illustrates the interaction between a subscriber identity module (SIM) 504, an access terminal (AT) 508, a network carrier 512, a GSM1x MSN 516, and a home carrier's network 520.

Initially, in establishing a connection between the user terminal 508 and the serving carrier network 512, a link control protocol (LCP) 524 is negotiated. Typically, the LCP negotiation is part of a standard PPP protocol. Upon establishment of a connection, a CHAP challenge 528, comprising essentially a random number, is sent from the serving carrier network 512 to the access terminal 508, and/or its associated SIM 504. The CHAP challenges originates from the serving carrier network 512. Upon receipt of the CHAP challenge 528, SIM 504 combines the received challenge (RAND 532) with its secret key (Ki) 536, and uses the two values through an algorithm 540 (A3), producing an output SRES 544. SRES 544 is then transmitted to the serving carrier network 512.

The serving carrier network 512 then verifies the secret key 536, and transmits the access terminal's international (IMSI) 548 through the GSM1x MSN 516 to the home carrier network 520. Upon receipt of the IMSI 548, the home carrier network 520 sends parameters 552 comprising a Kc (ciphering key), SRES, and a random number RAND through the GSM1x MSN 516 to the serving carrier network 512. The serving carrier network 512 then formulates a CHAP challenge 556 using the RAND received from the home carrier network 520. This CHAP challenge 556 is then transmitted to the access terminal 508 and/or its associated SIM 504, and undergoes the same process as described above. That is, upon receipt of the CHAP challenge 556, SIM 504 combines the received challenge (RAND 560) with its secret key (Ki) 564, and uses the two values through an algorithm 568 (A3), producing an output SRES 572. SRES 572 is then transmitted to the serving carrier network 512. The SRES 572 is then transmitted to the GSM1x MSN 516, where the SRES received from the home carrier network 520 is compared with the SRES received from the access terminal 508. If they match 576, authentication is accepted; otherwise, it is denied (580). The Acceptance/Failure message 584 is thus transmitted to the access terminal 508.

Thus, a novel and improved method and apparatus for the authentication of a user terminal between communications systems has been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a subscriber unit. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. In a wireless communication system, a method of authenticating a mobile station, the method comprising:
   transmitting a first CHAP challenge message;
   receiving a first CHAP response message;
   transmitting an IMSI message corresponding to the received first CHAP response message;
   receiving a plurality of parameters in response to the transmitted IMSI message;
   transmitting a second CHAP challenge message in response to the received plurality of parameters, wherein the second CHAP challenge message includes at least one parameter of the plurality of parameters;
   receiving a second CHAP response message in response to the transmitted parameter included in the second CHAP challenge message; and
   comparing the second CHAP response message to one of said plurality of parameters.

2. The method as set forth in claim 1, wherein the plurality of parameters comprise a cipher key, a SRES parameter, and a RAND parameter.

3. The method as set forth in claim 2, wherein the step of comparing comprises comparing a parameter of the second CHAP response message to the SRES parameter.

4. The method as set forth in claim 1, further comprising transmitting an acceptance message if a parameter of the second CHAP response message matches one of said plurality of parameters.

5. In a wireless communication system, an apparatus of authenticating a mobile station, the apparatus comprising:
   means for transmitting a first CHAP challenge message;
   means for receiving a first CHAP response message;
   means for transmitting an IMSI message corresponding to the received first CHAP response message;
   means for receiving a plurality of parameters in response to the transmitted IMSI message;
   means for transmitting a second CHAP challenge message in response to the received plurality of parameters, wherein the second CHAP challenge message includes at least one parameter of the plurality of parameters;
   means for receiving a second CHAP response message in response to the transmitted parameter included in the second CHAP challenge message; and
   means for comparing the second CHAP response message to one of said plurality of parameters.

6. The apparatus as set forth in claim 5, wherein the plurality of parameters comprise a cipher key, a SRES parameter, and a RAND parameter.

7. The apparatus as set forth in claim 6, wherein the means for comparing comprises comparing a parameter of the second CHAP response message to the SRES parameter.

8. The apparatus as set forth in claim 5, further comprising means for transmitting an acceptance message if a parameter of the second CHAP response message matches one of said plurality of parameters.

9. The apparatus as set forth in claim 5, wherein the second CHAP challenge message is transmitted before a CHAP success message is transmitted such that a CHAP success message is not transmitted between transmitting the first CHAP challenge message and transmitting the second CHAP challenge message.

10. The method as set forth in claim 1, wherein the step of transmitting the second CHAP challenge message is performed before a step of transmitting a CHAP success message such that a CHAP success message is not transmitted between transmitting the first CHAP challenge message and transmitting the second CHAP challenge message.

11. In a wireless communication system, an apparatus of authenticating a mobile station, the apparatus comprising:
   a network station configured to transmit a first CHAP challenge message to the mobile station;

the network station configured to receive a first CHAP response message from the mobile station;

the network station configured to transmit an IMSI message corresponding to the received first CHAP response message;

the network station configured to receive a plurality of parameters in response to the transmitted IMSI message;

the network station configured to transmit a second CHAP challenge message to the mobile station in response to the received plurality of parameters, wherein the second CHAP challenge message includes at least one parameter of the plurality of parameters;

the network station configured to receive a second CHAP response message from the mobile station in response to the transmitted parameter included in the second CHAP challenge message; and the network station configured to compare the second CHAP response message to one of said plurality of parameters.

12. The apparatus as set forth in claim 11, wherein the plurality of parameters comprise a cipher key, a SRES parameter, and a RAND parameter.

13. The apparatus as set forth in claim 12, wherein the second CHAP response message is compared to the SRES parameter.

14. The apparatus as set forth in claim 11, further comprising a station configured to transmit an acceptance message if a parameter of the second CHAP response message matches one of said plurality of parameters.

15. The apparatus as set forth in claim 11, wherein the second CHAP challenge message is transmitted to the mobile station before a CHAP success message is transmitted to the mobile station such that a CHAP success message is not transmitted between the first CHAP challenge message and the second CHAP challenge message.

16. A processor readable product, comprising:
processor non-trasitory readable medium storing:

instructions for causing a processor to cause a station to receive a first CHAP response message;

instructions for causing a processor to cause a station to transmit an IMSI message corresponding to the received first CHAP response message;

instructions for causing a processor to cause a station to receive a plurality of parameters in response to the transmitted IMSI message;

instructions for causing a processor to cause a station to transmit a second CHAP challenge message in response to the received plurality of parameters, wherein the second CHAP challenge message includes at least one parameter of the plurality of parameters;

instructions for causing a processor to cause a station to receive a second CHAP response message in response to the transmitted parameter included in the second CHAP challenge message; and instructions for causing a processor to cause a station to compare the second CHAP response message to one of said plurality of parameters.

17. The processor readable product as set forth in claim 16, wherein the plurality of parameters comprise a cipher key, a SRES parameter, and a RAND parameter.

18. The processor readable product as set forth in claim 17, wherein a parameter of the second CHAP response message is compared to the SRES parameter.

19. The processor readable product as set forth in claim 16, further comprising instructions for causing a processor to transmit an acceptance message if a parameter of the second CHAP response message matches one of said plurality of parameters.

20. The processor readable product as set forth in claim 16, wherein the second CHAP challenge message is transmitted before a CHAP success message is transmitted such that a CHAP success message is not transmitted between the first CHAP challenge message and the second CHAP challenge message.

* * * * *

UNITED STATES PATENT AND TRADEMARK OFFICE
CERTIFICATE OF CORRECTION

| | | |
|---|---|---|
| PATENT NO. | : 8,018,905 B2 | Page 1 of 1 |
| APPLICATION NO. | : 10/421218 | |
| DATED | : September 13, 2011 | |
| INVENTOR(S) | : Parekh | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1254 days.

Signed and Sealed this
Twenty-fourth Day of July, 2012

David J. Kappos
*Director of the United States Patent and Trademark Office*